US011156483B2

(12) United States Patent
Marnon et al.

(10) Patent No.: US 11,156,483 B2
(45) Date of Patent: Oct. 26, 2021

(54) FLOATING SENSOR

(71) Applicant: Arete Associates, Longmont, CO (US)

(72) Inventors: Michael Francis Marnon, Washington, DC (US); Guy Joseph Farruggia, Jr., Woodbine, MD (US); James Edward Friel, Falls Church, VA (US); Justin Peel, Alexandria, VA (US); Steven Richard Charles Floyd, Frederick, CO (US)

(73) Assignee: Arete Associates, Longmont, CO (US)

( * ) Notice: Subject to any disclaimer, the term of this patent is extended or adjusted under 35 U.S.C. 154(b) by 0 days.

(21) Appl. No.: 17/065,785

(22) Filed: Oct. 8, 2020

(65) Prior Publication Data

US 2021/0123779 A1 Apr. 29, 2021

Related U.S. Application Data

(60) Provisional application No. 62/912,359, filed on Oct. 8, 2019.

(51) Int. Cl.
*G01C 13/00* (2006.01)
*G01D 11/24* (2006.01)
*G01W 1/10* (2006.01)
*H02S 10/40* (2014.01)

(52) U.S. Cl.
CPC ......... *G01D 11/245* (2013.01); *G01C 13/002* (2013.01); *G01W 1/10* (2013.01); *H02S 10/40* (2014.12)

(58) Field of Classification Search
CPC ..... G01D 11/245; H02S 10/40; G01C 13/002; G01W 1/10
See application file for complete search history.

(56) References Cited

U.S. PATENT DOCUMENTS

| | | | |
|---|---|---|---|
| 7,484,468 B2 * | 2/2009 | Russell | B63B 35/00 114/61.1 |
| 7,496,000 B2 * | 2/2009 | Vosburgh | H01Q 1/04 367/134 |
| 8,314,506 B2 * | 11/2012 | Rhinefrank | F03B 13/20 290/53 |
| 2008/0192576 A1 * | 8/2008 | Vosburgh | H01Q 1/04 367/134 |
| 2008/0248703 A1 | 10/2008 | Russell | |
| 2010/0213710 A1 * | 8/2010 | Rhinefrank | F03B 13/20 290/42 |
| 2013/0146127 A1 | 6/2013 | Lunoe et al. | |
| 2018/0015989 A1 * | 1/2018 | Lee | F24S 30/425 |

* cited by examiner

*Primary Examiner* — Jamel E Williams
(74) *Attorney, Agent, or Firm* — FisherBroyles LLP; Gregory T. Fettig (57) ABSTRACT

Systems and methods herein provide for floating sensors. In one embodiment, a system includes a waterproof housing, an electronics assembly mounted within the waterproof housing, and a wing structure hingeably attached to the waterproof housing and operable to float the system on a water surface. The system also includes a solar panel configured on the wing structure to provide power to the electronics assembly.

22 Claims, 7 Drawing Sheets

FLOATING SENSOR

CROSS REFERENCE TO RELATED APPLICATIONS

This patent application claims priority to, and thus the benefit of an earlier filing date from, U.S. Provisional Patent Application No. 62/912,359 (filed Oct. 8, 2019), the contents of which are hereby incorporated by reference.

SUMMARY

Systems and methods herein provide for floating sensors. In one embodiment, a system includes a waterproof housing, an electronics assembly mounted within the waterproof housing, and a wing structure hingeably attached to the waterproof housing and operable to float the system on a water surface. The system also includes a solar panel configured on the wing structure to provide power to the electronics assembly.

The various embodiments disclosed herein may be implemented in a variety of ways as a matter of design choice. For example, some embodiments herein are implemented in hardware, whereas other embodiments may include processes that are operable to implement and/or operate the hardware. Other exemplary embodiments, including hardware, software, firmware, and various combinations thereof are described below.

BRIEF DESCRIPTION OF THE FIGURES

Some embodiments are now described, by way of example only, and with reference to the accompanying drawings. The same reference number represents the same element or the same type of element on all drawings.

DETAILED DESCRIPTION OF THE FIGURES

The figures and the following description illustrate various exemplary embodiments. It will thus be appreciated that those skilled in the art will be able to devise various arrangements that, although not explicitly described or shown herein, embody various principles of design and/or operation and are included within the scope of the embodiments. Furthermore, any examples described herein are intended to aid in understanding the principles of the embodiments and are to be construed as being without limitation to such specifically recited examples and conditions.

Figure 1A:
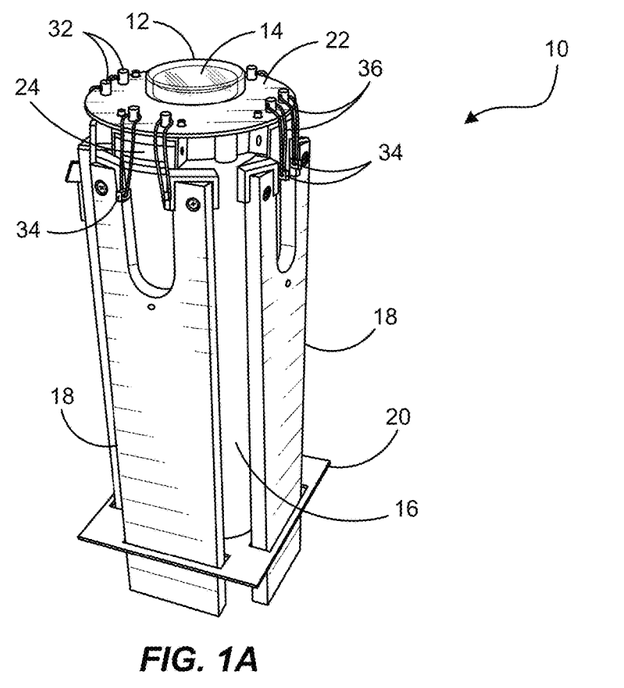
FIG. 1A is a perspective view of an exemplary floating system configuration prior to deployment.
Figure 1B:
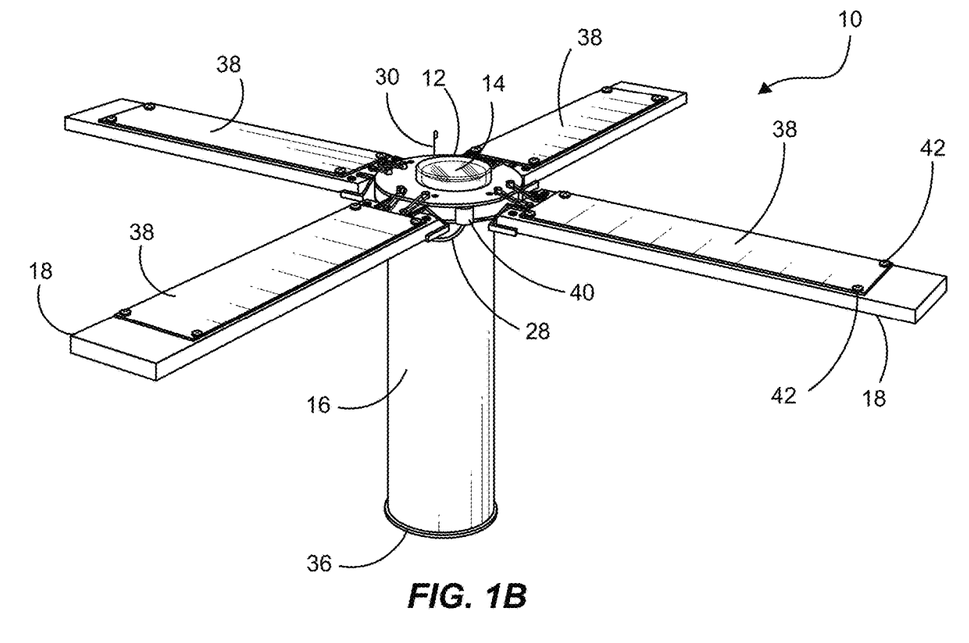
FIG. 1B is a perspective view of the exemplary floating system configuration after deployment.

FIGS. 1A and 1B illustrate perspective views of a floatable system 10. In FIG. 1A, the system 10 is illustrated in a packaged form prior to deployment. FIG. 1B illustrates a system 10 in a deployed form. The system 10 comprises a waterproof housing 16 in which an electronics assembly (not shown) is mounted. The housing 16 may be configured with a mounting base 22 that is operable to seal the housing 16 and to protect the electronics assembly therein from water as the system 10 floats in the water. The mounting base 22 may also be configured with a sensor housing 12 that includes one or more sensors and/or cameras 14.

The mounting base 22 may be operable to mount a wing structure 18 to the housing 16. The "wings" of the wing structure 18 are used to float the system 10 on the water surface. Prior to deployment in the water, the system 10 may be configured with a restraint mechanism 20 that retains the wing structure 18. For example, the wings 18 may be hingeably attached to the mounting base 22. The restraint mechanism 20 may be configured from a water soluble material (e.g., water soluble paper, tape, thread, board stock, etc.) such that, when the system 10 deploys in a water environment, the restraint mechanism 20 dissolves and releases the wings 18. From there, the wings 18 rise and float the system 10 with the housing 16 being submerged in the water, as illustrated in FIG. 1B. While the system 10 is illustrated with four rectangularly shaped wings 18, the system 10 may be configured with any number of wing like structures in any of a variety of shapes so long as the wings 18 maintain buoyancy for the overall system 10.

A hinge mechanism 24 may be used to attach the wings 18 to the mounting base 22 and may be configured to prevent the wings 18 from deploying past the mounting base 22. For example, the hinge mechanism 24 may be attached to the housing 16 (or be a part of the housing 16 and/or the mounting base 22). The hinge mechanism 24 may also be hingeably attached to the wings 18. The hinge mechanism 24 may allow the wings move upward when the restraint mechanism 20 dissolves in water (e.g., after deployment) and releases the wings 18. The wings 18 may travel upward towards the top of the system 10 such that the top surface of the wings 18 is substantially in the same plane as the mounting base 22. In this regard, the hinge mechanism 24 may limit the upward motion of the wings to the plane of the mounting base 22. And, when the wings 18 are released, the housing 16 may be submerged underwater, revealing generally only the wings 18 and the sensor housing 12 as the system 10 floats in the water.

To propel the wings 18 upwards, the hinge mechanism may include tensioners 26 (e.g., rubber bands, springs, or the like) attached to the wings 18 and to the mounting base 22 that are operable pull the wings 18 upwards when released by the restraint mechanism 20. As shown, the tensioners 26 are secured to the mounting base 22 via pins 32 configured with the mounting base 22. For example, the pins 32 may be configured with or otherwise mounted to the mounting base 22. The pins 32 may have holes through which the tensioners 26 pass and attach to the wings 18 (e.g., via attachment points 34 on the wings 18). However, the tensioners 26 may attach to the wings 18 and the mounting base 22 in other ways as a matter of design choice.

It should be noted that the wings 18 may be configured to open in other ways as a matter of design choice. For example, the restraint mechanism 20 may be configured of a buoyant material such that it slides up the housing 16 to the tensioners 26 when deployed in water to release the wings 18. It should also be noted that the wings 18 may be hingeably attached to the mounting base 22 and/or the housing 16 as a matter of design choice. For example, the hinge mechanism 24 may be or include barrel hinges, butt hinges, butterfly hinges, case hinges, concealed hinges, spring hinges, or the like.

The wings 18 may be configured with solar panels 38, as illustrated in FIG. 1B. The solar panels 38 may be attached to the wings 18 in any of a variety of ways as a matter of design choice (e.g., glue, screws 42, fasteners, etc.). The solar panels 38 are operable to provide power to the electronics assembly within the housing 16 and to the various sensors and/or cameras configured in the sensor housing 12. For example, the solar panels 20 may be configured with a plurality of photovoltaic cells that generate power from solar energy. Each solar panel may direct that power to the electronics assembly and/or the sensors and cameras via power lines 28 into the housing 16 to various batteries, voltage distribution devices, and/or voltage regulation devices within the housing 16. Inlets 40 to the housing 16 through which the power lines 28 enter may be sealed to protect the electronics assembly within the housing 16 from water ingress.

In some embodiments, the electronics assembly of the system 10 may be configured with a communication module that is operable to communicate with various forms of communications systems. In this regard, the system 10 may be configured with an antenna 30 for communicating data from the sensors 14 configured with the system 10. For example, the communication module may convey sensor data to a satellite, a sensor system, a shipborne communication system, an airborne communication system, and/or a land based communication system. In some embodiments, the electronics assembly also includes a Global Positioning System (GPS) such that data pertaining to the system's location can be conveyed via the communication system of the electronics assembly.

While the system 10 may be configured to passively navigate the body of water (e.g. via water current, etc.), some embodiments may call for a motorized version of the system 10. For example, the system 10 may be configured with a propeller that is operable to propel the system 10 across the body of water via remote control and/or via self-control.

Additionally, while the system 10 has been discussed with respect to a plurality of different sensor types, the embodiments herein are not intended to be so limited. Rather, the system 10 may be configured with other forms of sensors and/or electronics such as digital cameras, video recorders, and the like. For example, a camera may be housed within the sensor structure 12. In this regard, the sensor structure 12 may be transparent to allow the camera 14 to record images of the environment external to the system 10.

Other examples of devices that may be included with the electronics assembly include at least one of: a global positioning system (GPS) sensor; a water temperature sensor; an air temperature sensor; an alkalinity sensor; a motion sensor; a turbidity sensor; an accelerometer; a light sensor; an air purity sensor; a chemical detection sensor; an RF receiver; a software-defined radio; a pH sensor; a water quality sensor; a dissolved gas sensor; an accelerometer; a gyroscope; a magnetometer; a gas composition sensor; a fluorometer; an optical transmissometer; a scattering sensor; an irradiance detector; an acoustic sensor; a nitrate detector; a nitrite detector; a wind speed sensor; a direction sensor; a conductivity sensor; a sound speed meter; a turbulence meter; a hyperspectral sensor; a bioluminescence detector; or a phosphate sensor.

Figure 2A:
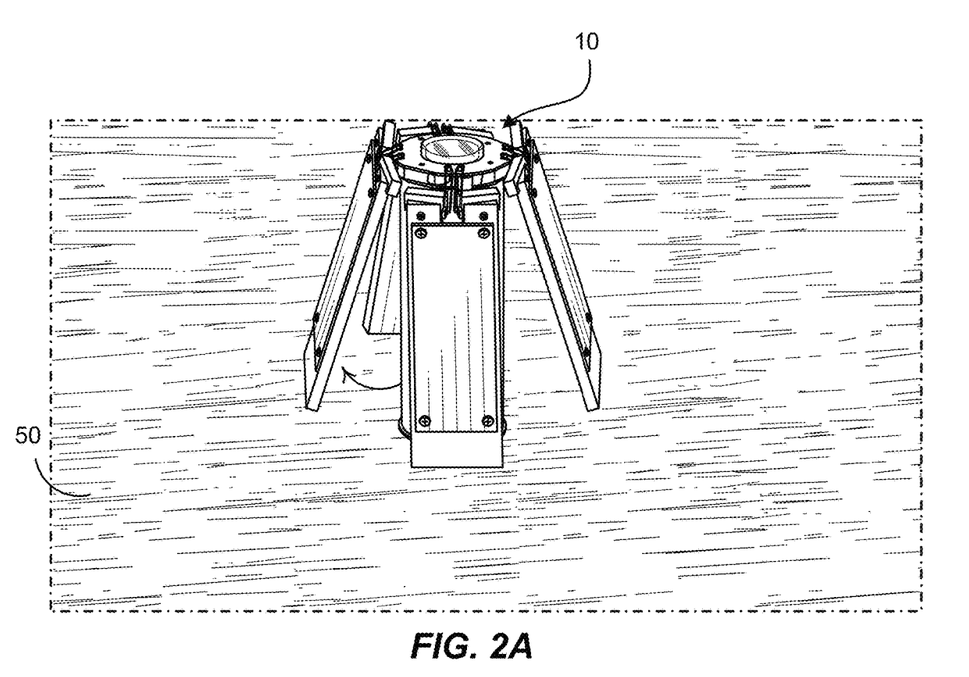
FIG. 2A is a perspective view of the exemplary floating system being deployed.
Figure 2B:
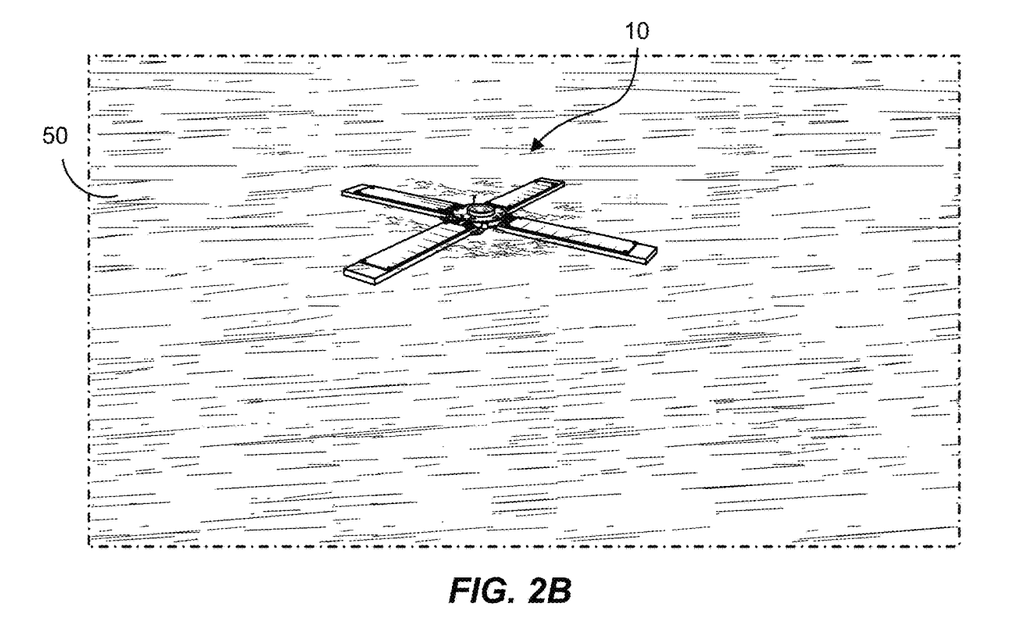
FIG. 2B is a perspective view of the exemplary floating system configuration after deployment.

FIGS. 2A and 2B are perspective views of the exemplary floating system being deployed. In FIG. 2A, the system 10 drops in the water 50 and the restraint mechanism releases the wings 18. And, once the wings 18 are released, the wings 18 float the system 10 in the water 50 as illustrated in FIG. 2B.

Motion of the sensors in the sensor housing 12 and/or the housing 16 may be collected to provide information on wave motion and water currents. One or more upward looking cameras 14 in the sensor housing 12 may be used to collect cloud cover data (e.g., imagery of the clouds). Sea-surface temperature sensors in the sensor housing 12 (and/or configured in the housing 16) may provide information on ocean weather for validating and/or improving weather forecasting models. Additional temperature measurements may be used to provide temperature discontinuities across the water surface for boundary layer analysis. And, acoustic spectra from hydrophones and microphones may be used to infer wind speeds and sea-state.

In some embodiments, the system 10 has a self-scuttling feature that allows the system 10 to sink. For example, when the system 10 is no longer needed and/or when the owner wishes to prevent others from retrieving the system 10, the system 10 may mechanically detach the wing structure 18 such that the system 10 sinks in the water.

Alternatively or additionally, a heating mechanism within the system 10 (e.g., in the waterproof housing 16) may be utilized to cause mechanical failure of the pressure vessel (e.g., the waterproof housing 16). For example, the housing 16 may also be configured with the base 36 that seals the housing 16 from water ingress. The heating mechanism may be configured with the base 36 to eject a stopper in the base 36 so as to cause intentional mechanical failure that provides water ingress into the waterproof housing 16. Thus, when the water fills the housing 16, the buoyancy of the wings 18 may no longer be sufficient to float the system 10 and the system 10 sinks.

Figure 3:
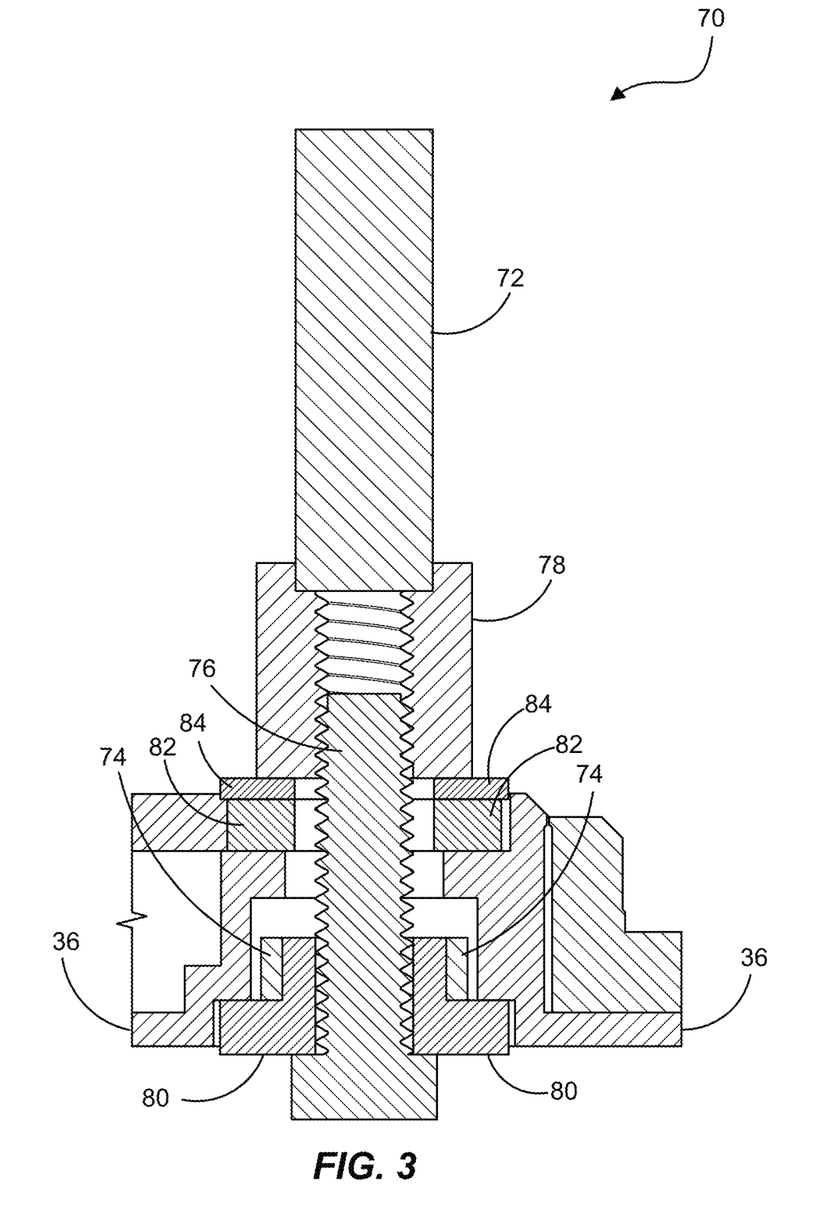
FIG. 3 is a cut away view of an exemplary scuttling mechanism operable to submerge the system.

FIG. 3 shows one exemplary embodiment of the heating mechanism 70 that includes a cartridge heater 72. The cartridge heater 72, in this embodiment is secured to a machine threaded coupler 78. A nylon screw 76 is screwed into the machine threaded coupler 78 and secured by a rubber washer 84 and a metal washer 82. The cartridge heater 72 is operable to cause threads of the nylon screw 76 to fail. When the threads fail, a compression spring 74 may eject a rubber stopper 80 on the base 36 of the system 10 and allow water to enter the housing 16 and submerge the system 10. For example, the weight of the water-filled housing 16 may exceed the buoyancy of the wing structure 18. Thus, the system 10 may scuttle even though the wing structure 18 is still deployed.

The self-scuttling feature may be triggered in any number of ways. For example, self-scuttling may be triggered by a radio message to a communication module configured with the electronics assembly, a low battery signal, extended loss of communication, extended loss of GPS signal, or based on GPS location. These triggers are only a subset of the possibilities, which could also include internal algorithmic-based triggers and/or based on duration of operation.

In some embodiments, the cartridge heater 72 is a tube-shaped, heavy-duty, industrial Joule heating element used in the process heating industry, usually custom manufactured to a specific watt density, based on its intended application. However, other types of heating may be used as a matter of design choice.

Figure 4:
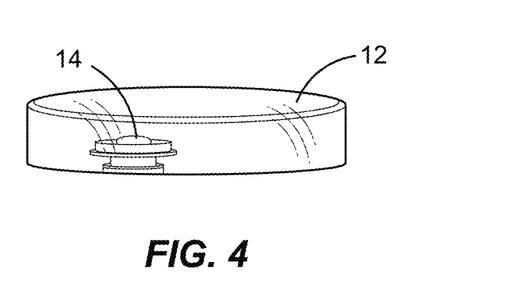
FIG. 4 is a block diagram of an exemplary sensor housing configured with the floating system.

FIG. 4 is a perspective view of the sensor housing 12, in one exemplary embodiment. In this embodiment, the sensor housing 12 may be configured from a transparent material to allow imagery to be obtained from a camera 14. For example, when the system 10 is deployed and floating in a water environment, the camera 14 may obtain imagery of cloud coverage, weather conditions, and/or nautical traffic.

Figure 5:
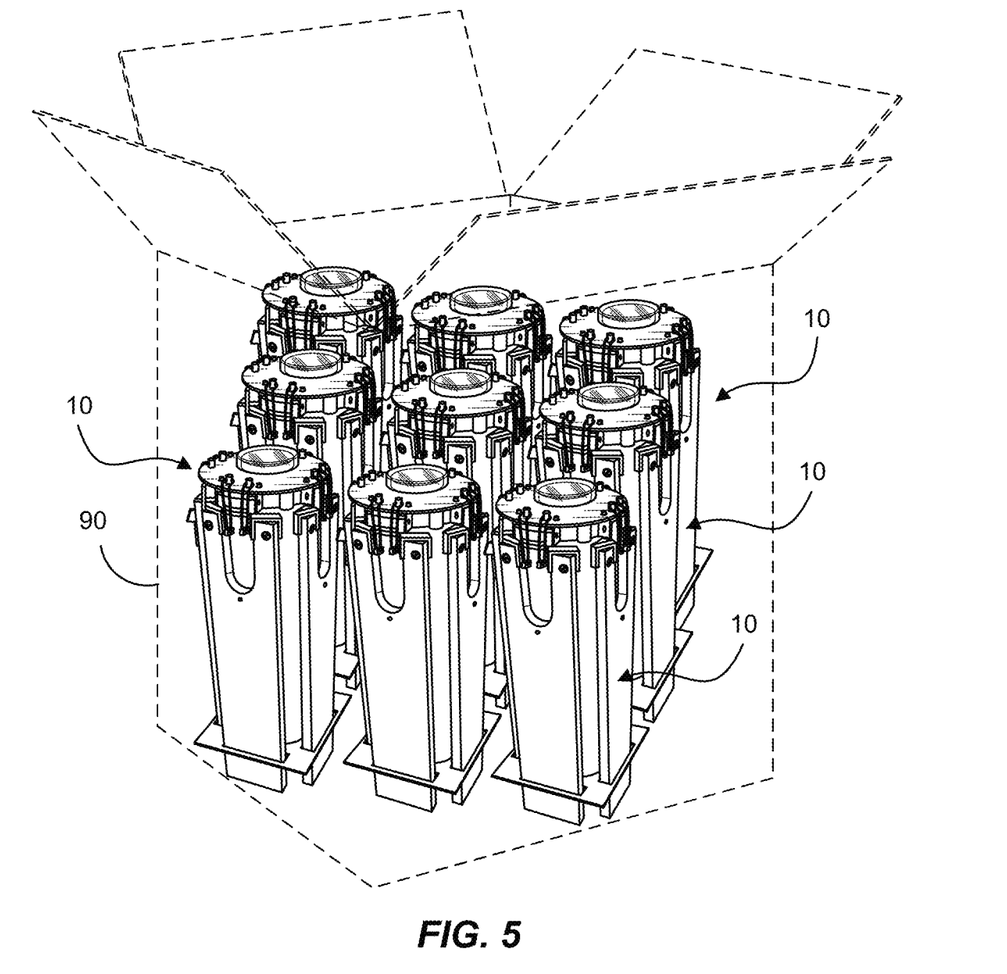
FIG. 5 is an illustration of exemplary packaging for a plurality of floating system.

FIG. 5 is an illustration of an exemplary packaging 90 for a plurality of floating systems 10. In this embodiment, the packaging system 90 provides a compact form for delivering a plurality of floating systems 10. As shown above, the systems 10 are configured with restraint mechanisms 20 (e.g., water dissolvable) that retain the deployable wing structures 18 such that the systems 10 may be delivered in a compact form (e.g., in a box). When deployed in water, the restraint mechanisms 20 may dissolve and such that the wing structures 18 hingeably deploy.

Figure 6:
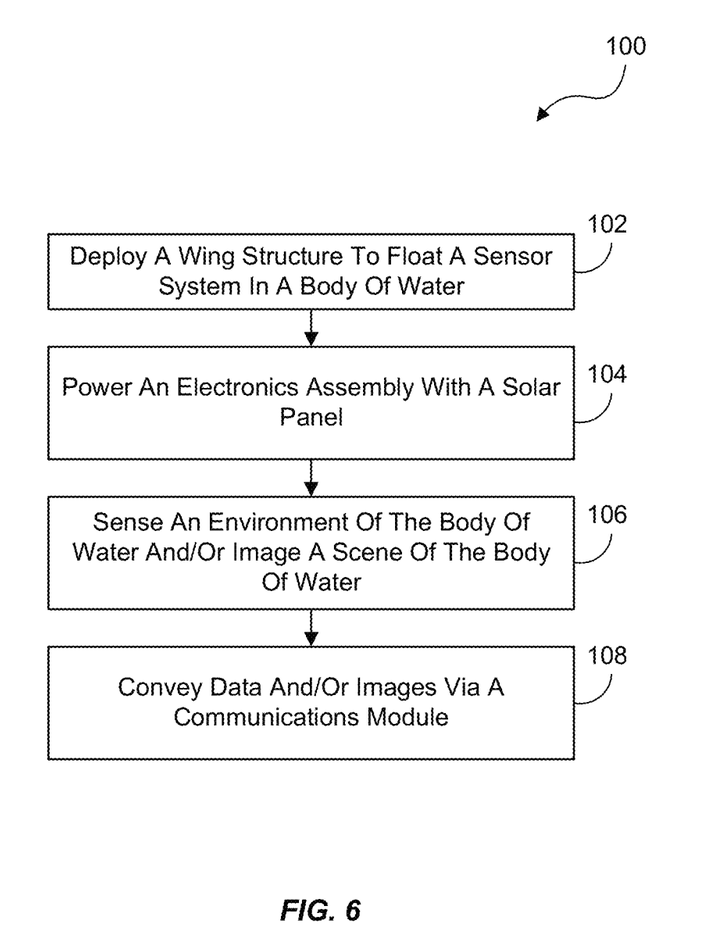
FIG. 6 is a flowchart of an exemplary process of the system.

FIG. 6 is a flowchart of an exemplary process 100 of the system 10. In this embodiment, when the system 10 is placed in the water, the system 10 deploys a wing structure 18 that is operable to float the system 10 in the water, in the process element 102. A solar panel 38 may be configured with the wing structure 18 as shown and described above. Thus, when the wing structure 18 is deployed, the solar panel 38 may receive solar energy to power an electronics assembly configured within the waterproof housing 16, in the process element 104. With the electronics assembly being powered, the system 10 may sense the environment of the body water and/or image a scene of the body of water, in the process element 106. Thereafter, the system 10 may convey sensor data, image data, and/or video data via a communications module, in the process element 108. For example, the electronics assembly of the system 10 may convey the sensor data, images, and/or video to a satellite, another system 10, a shipborne communication system, an airborne communication system, and/or a land based communication system.

Figure 7:
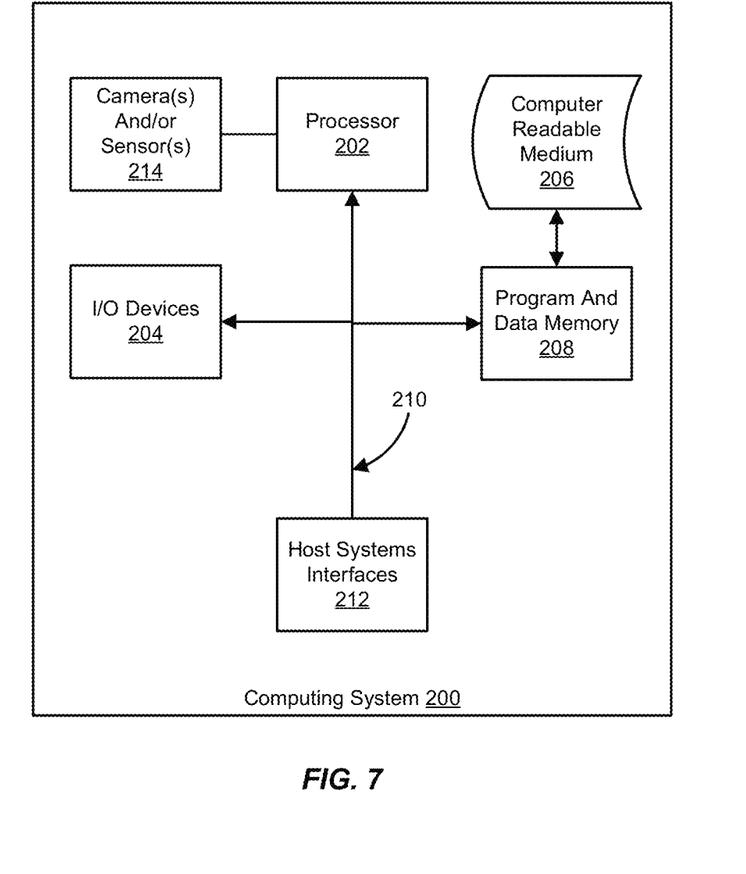
FIG. 7 is a block diagram of an exemplary computing system in which a computer readable medium provides instructions for performing one or more methods herein.

Any of the above embodiments herein may be rearranged and/or combined with other embodiments. Accordingly, the invention is not to be limited to any particular embodiment disclosed herein. Additionally, the invention can also take the form of an entirely hardware embodiment or an embodiment containing both hardware and software elements. FIG. 7 illustrates a computing system 200 in which a computer readable medium 206 may provide instructions for performing any of the methods disclosed herein.

Furthermore, some aspects of the embodiments herein can take the form of a computer program product accessible from the computer readable medium 206 to provide program code for use by or in connection with a computer or any instruction execution system. For the purposes of this description, the computer readable medium 206 can be any apparatus that can tangibly store the program code for use by or in connection with the instruction execution system, apparatus, or device, including the computing system 200.

The computer readable medium 206 can be any tangible electronic, magnetic, optical, electromagnetic, infrared, or semiconductor system (or apparatus or device). Some examples of a computer readable medium 206 include solid state memories, magnetic tapes, removable computer diskettes, random access memories (RAM), read-only memories (ROM), magnetic disks, and optical disks. Some examples of optical disks include read only compact disks (CD-ROM), read/write compact disks (CD-R/W), and digital versatile disks (DVD).

The computing system 200 can include one or more processors 202 coupled directly or indirectly to memory 208 through a system bus 210. Additionally, the computing system 200 may have one or more cameras and/or sensors 214 coupled to the processor(s) 202 to perform in accordance with the embodiments disclosed hereinabove. The memory 208 can include local memory employed during actual execution of the program code, bulk storage, and/or cache memories, which provide temporary storage of at least some of the program code in order to reduce the number of times the code is retrieved from bulk storage during execution.

Input/output (I/O) devices 204 (including but not limited to keyboards, displays, pointing devices, I/O interfaces, etc.) can be coupled to the computing system 200 either directly or through intervening I/O controllers. Network adapters may also be coupled to the computing system 200 to enable the computing system 200 to couple to other data processing systems, such as through host systems interfaces 212, printers, and/or or storage devices through intervening private or public networks. Modems, cable modems, and Ethernet cards are just a examples of network adapter types.

What is claimed is:
1. A system, comprising:
a waterproof housing;
an electronics assembly mounted within the waterproof housing;
a wing structure hingeably attached to the waterproof housing and operable to float the system on a water surface;
a solar panel configured on the wing structure to provide power to the electronics assembly; and
a battery system operable to receive charge from the solar panel.
2. The system of claim 1, further comprising:
a mounting mechanism affixed to the waterproof housing, and operable to provide a watertight seal to the waterproof housing, and to hingeably attach the wing structure to the waterproof housing.
3. The system of claim 1, further comprising:
a water-dissolvable restraint mechanism operable to retain the wing structure proximate to the waterproof housing until the system is deployed in water.
4. The system of claim 3, further comprising:
a deployment mechanism mechanically coupled to the wing structure and operable to deploy the wing structure from the waterproof housing when the water-dissolvable restraint mechanism dissolves and releases the wing structure.
5. The system of claim 4, wherein:
the deployment mechanism is further operable to automatically deploy the wing structure such that the solar panel faces the sun when the system is deployed in the water.
6. The system of claim 5, wherein:
the deployment mechanism is further operable to constrain a range of motion of the wing structure such that the wing structure does not deploy substantially beyond a top of the waterproof housing.
7. The system of claim 6, wherein:
a substantial portion of the waterproof housing is submerged in the water when the system is deployed.

8. The system of claim 1, wherein:
the electronics assembly comprises a processor operable to control one or more electronic devices.

9. The system of claim 8, wherein:
the one or more electronic devices comprises at least one sensor device configured with the system.

10. The system of claim 9, wherein:
the at least one sensor device comprises at least one of: a global positioning system (GPS) sensor; a water temperature sensor; an air temperature sensor; an alkalinity sensor; a motion sensor; a turbidity sensor; an accelerometer; a light sensor; an air purity sensor; a chemical detection sensor; an RF receiver; a software-defined radio; a pH sensor; a water quality sensor; a dissolved gas sensor; an accelerometer; a gyroscope; a magnetometer; a gas composition sensor; a fluorometer; an optical transmissometer; a scattering sensor; an irradiance detector; an acoustic sensor; a nitrate detector; a nitrite detector; a wind speed sensor; a direction sensor; a conductivity sensor; a sound speed meter; a turbulence meter; a hyperspectral sensor; a bioluminescence detector; or a phosphate sensor.

11. The system of claim 9, wherein:
the electronics assembly comprises a communication module operable to communicate sensor data from the at least one sensor to at least one of: a satellite communication system; a shipborne communication system; an airborne communication system; or a land-based communication system.

12. The system of claim 8, further comprising:
a scuttling mechanism operable to provide water ingress to the waterproof housing to sink the system.

13. The system of claim 1, wherein:
the wing structure comprises three or more wings hingeably attached to the waterproof housing.

14. A method, comprising:
deploying a wing structure of a sensor system in a body of water to float the sensor system on a surface of the water;
charging a battery from a solar panel configured with the wing structure;
powering an electronics assembly with the battery;
sensing an environment of the water with the sensor system; and
conveying sensor data from the sensor system via a communications module configured with the electronics assembly.

15. The method of claim 14, further comprising:
conveying image data from the sensor system via the communication module.

16. The method of claim 14, further comprising:
scuttling the sensor system by directing a scuttling mechanism to allow water ingress to a housing of the sensor system.

17. The method of claim 16, wherein:
scuttling the sensor system comprises directing a heater to fail threads of the scuttling mechanism configured with the sensor system and to eject a stopper in a base of the sensor system.

18. The method of claim 14, wherein:
the sensor system comprises at least one of: a global positioning system (GPS) sensor; a water temperature sensor; an air temperature sensor; an alkalinity sensor; a motion sensor; a turbidity sensor; an accelerometer; a light sensor; an air purity sensor; a chemical detection sensor; an RF receiver; a software-defined radio; a pH sensor; a water quality sensor; a dissolved gas sensor; an accelerometer; a gyroscope; a magnetometer; a gas composition sensor; a fluorometer; an optical transmissometer; a scattering sensor; an irradiance detector; an acoustic sensor; a nitrate detector; a nitrite detector; a wind speed sensor; a direction sensor; a conductivity sensor; a sound speed meter; a turbulence meter; a hyperspectral sensor; a bioluminescence detector; or a phosphate sensor.

19. The method of claim 14, wherein conveying the sensor data comprises:
communicating the sensor data to at least one of: a satellite communication system; a shipborne communication system; an airborne communication system; or a land-based communication system.

20. The method of claim 14, wherein deploying the wing structure further comprises:
dissolving a restraint mechanism operable to retain the wing structure proximate to a housing of the sensor system when the sensor system is deployed in the water.

21. The method of claim 14, wherein deploying the wing structure further comprises:
deploying the wing structure such that the solar panel automatically faces the sun when the system is deployed in the water.

22. The method of claim 14, further comprising:
constraining a range of motion of the wing structure such that the wing structure does not deploy substantially beyond a top of a waterproof housing that houses the battery and the electronics assembly.

* * * * *

UNITED STATES PATENT AND TRADEMARK OFFICE
CERTIFICATE OF CORRECTION

| | | |
|---|---|---|
| PATENT NO. | : 11,156,483 B2 | Page 1 of 1 |
| APPLICATION NO. | : 17/065785 | |
| DATED | : October 26, 2021 | |
| INVENTOR(S) | : Marnon et al. | |

It is certified that error appears in the above-identified patent and that said Letters Patent is hereby corrected as shown below:

In the Specification

On Column 1, Line 2, before the section entitled "CROSS REFERENCE TO RELATED APPLICATIONS", please insert the following paragraph:
-- STATEMENT REGARDING FEDERALLY SPONSORED RESEARCH OR DEVELOPMENT
This invention was made with government support under contract no. N6600119C4001 awarded by SPAWAR SYSTEMS CENTER PACIFIC. The government has certain rights in the invention. --

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*